United States Patent [19]

Cheetham et al.

[11] 4,402,346

[45] Sep. 6, 1983

[54] CRUDE OIL PIPE HAVING LAYERS OF GRADUATED PERMEABILITY TO HYDROGEN SULFIDE

[75] Inventors: Ivan C. Cheetham; Jack M. Lowe, both of Sutton Coldfield; Glyn H. Redmond, Birmingham, all of England

[73] Assignee: Dunlop Limited, London, England

[21] Appl. No.: 415,691

[22] Filed: Sep. 7, 1982

Related U.S. Application Data

[63] Continuation of Ser. No. 294,622, Aug. 20, 1981, abandoned, which is a continuation of Ser. No. 19,611, Mar. 12, 1979, abandoned.

[30] Foreign Application Priority Data

Mar. 14, 1978 [GB] United Kingdom ............... 10055/78

[51] Int. Cl.³ ........................ F16L 11/00; F16L 55/00
[52] U.S. Cl. .................................... 138/129; 138/103; 138/125; 138/130; 138/132; 138/133; 138/137; 138/138; 138/DIG. 3; 428/36
[58] Field of Search .................. 428/36; 138/125, 129, 138/130, 132, 133, 137, 138, 103, DIG. 2, DIG. 3

[56] References Cited

U.S. PATENT DOCUMENTS 3,212,528 10/1965 Haas .
3,357,456 12/1967 Grawey et al. .
3,420,276 1/1969 Skinner et al. .
3,548,884 12/1970 Ambrose .
3,604,461 9/1971 Matthews .
3,729,028 4/1973 Horvath et al. .

FOREIGN PATENT DOCUMENTS 1052022 1/1954 France .
1528051 4/1968 France .
2404792 9/1977 France .
1202094 8/1970 United Kingdom .
1227137 4/1971 United Kingdom .
1363886 8/1974 United Kingdom .
1414496 11/1975 United Kingdom .
1470455 4/1977 United Kingdom .
1575355 9/1980 United Kingdom .

*Primary Examiner*—William R. Dixon, Jr.
*Attorney, Agent, or Firm*—Stevens, Davis, Miller & Mosher

[57] ABSTRACT

A pipe for transporting crude oil comprises a layer of polymeric material for containing oil within the bore of the pipe, the polymeric material being surrounded and supported by a reinforcement structure comprising high tensile reinforcement elements which are protected from corrosion by gases passing from the polymeric layer through the reinforcement structure. The reinforcement element may be provided with a protective sheath, for example of low permeability material or a material which possesses electrolytic action, or the reinforcement element may be embedded in a matrix of high permeability material such that a preferential path is provided for the passage of gases through the reinforcement structure.

28 Claims, 2 Drawing Figures

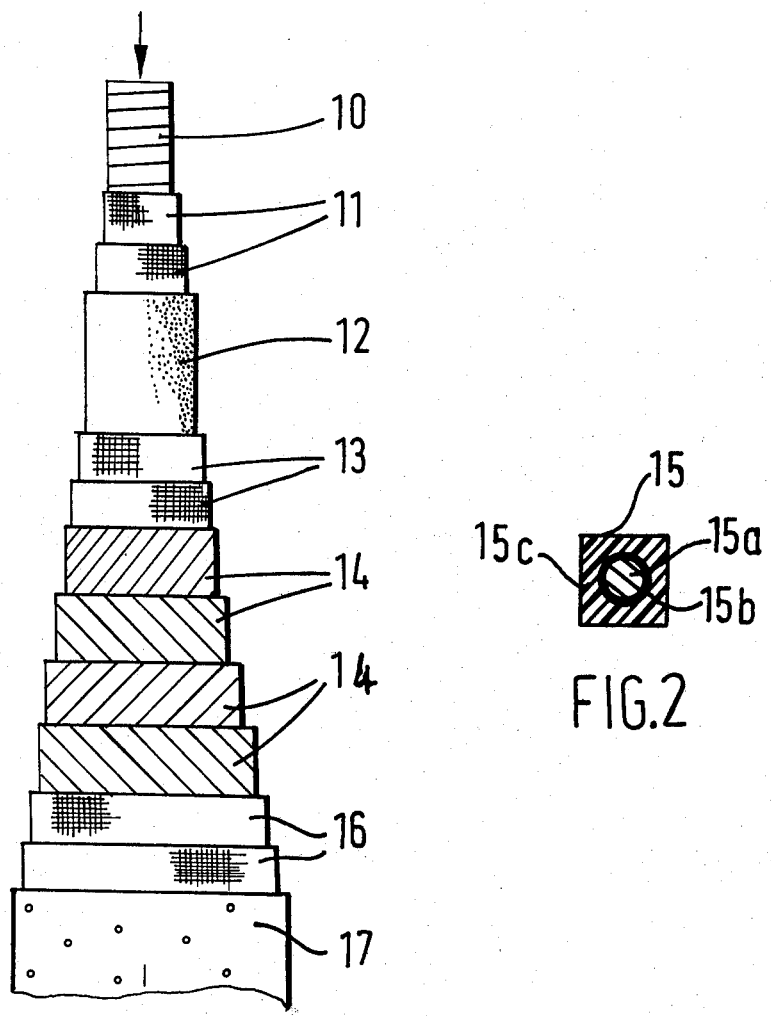

CRUDE OIL PIPE HAVING LAYERS OF GRADUATED PERMEABILITY TO HYDROGEN SULFIDE

This is a continuation of application Ser. No. 294,622 filed Aug. 20, 1981, abandoned which in turn is a continuation of application Ser. No. 19,611 filed Mar. 12, 1979 abandoned.

This invention relates to a pipe and in particular, though not exclusively, to a high pressure flexible pipe suitable for the transportation of crude oil.

It is currently a well established practice to form pipes from tubes of steel or other suitable metal for transporting crude oil over the sea bed from an offshore oil well to a relatively remote storage or distribution site. For installations where the crude oil has a temperature of up to 100° C. and contains no significant proportion of corrosive gases such as carbon dioxide or hydrogen sulphide (the oil then being referred to as "sweet") tubes of steel or like material give acceptable service. Where, however, the crude oil contains a significant proportion of corrosive gases (the oil then being referred to as "sour"), and/or the oil temperature is higher than 100° C. it is found that such tubes have a limited life and very often require replacement before the well runs dry.

To seek to overcome this problem it has been proposed to line the steel tube with a protective layer of polymeric material such as nylon but at the pressures and temperatures experienced in service even relatively low permeability polymeric materials do not adequately restrict the migration of corrosive gases into contact with the steel tube.

It is an object of the present invention to provide a pipe having an improved corrosion resistance, especially when carrying crude oil.

In accordance with one aspect of the present invention a pipe for transporting crude oil comprises a layer of polymeric material for containing oil within the bore of the pipe and a reinforcement structure for supporting said layer of polymeric material, for reinforcement structure lying radially outwards of said layer of polymeric material and comrising a high tensile reinforcement element embedded in a matrix of a material having a permeability greater than $150 \times 10^{-8}$ ($cm^3 cm/s/cm^2/bar$) measured as defined in the following paragraph.

In this specification permeability is measured as the permeability to hydrogen sulphide at 20° C.

In accordance with another aspect of the present invention a pipe for transporting crude oil comprises a layer of polymeric material for containing oil within the bore of the pipe and reinforcement structure for supporting said layer of polymeric material, the reinforcement structure lying radially outwards of the layer of polymeric material and comprising successive turns of at least one high tensile reinforcement element provided with a protective sheath and having a permeability which is low compared with that of paths extending between the successive turns from a radially inner to a radially outer surface of the reinforcement structure so as to provide a preferential path for the passage of corrosive gases from the polymeric layer through the reinforcement structure.

The terms "high" or "low" as used in this specification in relation to relative permeabilities mean that one permeability is at least five times more or five times less, respectively, than the other permeability.

Preferably the reinforcement element lies in a matrix having a permeability greater than $150 \times 10^{-8}$ ($cm^3/cm/s/cm^2/bar$) and more preferably a permeability greater than twice that figure.

The matrix may be a material in which the element is embedded such that said succesive turns are located and maintained in a stable relative relationship or, alternatively embedding material may be omitted at least in part such that the successive turns are spaced apart, if only slightly, over at least part of their length so as to provide a substantially direct path for the flow of corrosive gases.

The high tensile reinforcement element may be provided with a protective sheath of a material which has a low permeability compared with the material of the matrix. Protection of the reinforcement element may also be afforded by means of a protective sheath in the form of a coating which exhibits electrolytic action in combination with the material of the reinforcement element. A layer which protects by electrolytic action may also offer some protection by virtue of having a low permeability, but even in this case additional protection may be afforded by a sheath of low permeability material provided over the cathodic protection layer. Other means of providing protection include the provision of a sheath or of inert non-metallic material such as of phosphates or silicates.

The reinforcement element preferably comprises high tensile steel strip, or wires which may be a single wire, strand or cable form, and such elements may be wound helically relative to the direction of the length of the pipe. To provide a balanced construction 2 or 4 reinforcement layers may be formed with the reinforcement elements extending in opposite senses in successive layers, and each layer may comprise one or more helically wound elements. More than 4 reinforcement layers may be provided but to provide good flexibility to assist in laying of the pipe by continuous feed over the side of a pipe laying vessel it is preferred in general that there are no more than four reinforcement layers. As an alternative to one or more helically wound reinforcement elements in the reinforcement structure, or each layer thereof, the reinforcement structure may comprise a plurality of elements in the form of rings, said rings being spaced along the length of the reinforcement structure.

One embodiment of the invention will now be described, by way of example, with reference to the accompanying drawings in which:

FIG. 1 shows a pipe cut away in section to reveal its successive layers, and

FIG. 2 shows in detail the cross-section of the helical reinforcing elements.

The pipe illustrated is a 3 inch bore high pressure flexible pipe for the transportation of crude oil.

The pipe comprises a crush resisting inner lining layer 10 formed from a twin start helix of type "316" stainless steel wire, the wires being of substantially triangular trapezoidal section and arranged such that contacting surfaces of the wires between successive turns of the helices have a substantially frusto-conical shape and taper in opposite directions relative to the length of the hose. A crush resisting or armoring layer of this kind is described in more detail in the specification of assignee's co-pending application Ser. No. 928,146 filed July 26, 1978 and to assist in providing a good degree of flexibility the layer 10 is constructed such that the two contacting surfaces between three successive turns of the armouring layer are of a substantially frusto-conical shape and taper in opposite directions relative to the length of the pipe as also described in said co-pending application.

In addition to resisting crushing loads the layer 10 is intended to provide an abrasion resistant lining which permits the passage of tools through the pipe without causing damage to the inner surface of the pipe.

The lining layer 10 is surrounded if necessary by two wrapping layers 11 of glass fabric material, formed by helically wound strips, to act as a radially inner boundary for a subsequently extruded fluid sealing layer 12 of fluoroplastics which is resistant to oil penetration and thus serves to contain oil from leaking through the hose wall. Suitable fluoroplastics include Tefzel, Teflon FEP and Teflon PFA (ex Du Pont) and to ensure an adequate barrier to leakage of oil it is envisaged that the sealing layer should have a thickness in the range 5 to 9 mm. The wrapping layers 11 may be omitted if on formation of the sealing layer 12 by extrusion or other means for fluoroplastics does not flow significantly into space between the wires of the lining layer 10 and inhibit flexibility.

The layer 12 is then surrounded by two wrapping layers 13 also formed by helically wound strips of glass fabric material. These layers serve to contain the fluoroplastics especially when the latter is subjected to high pressures within the bore of the pipe. To assist in this the fabric preferably is of a close weave and, especially if not of a close weave construction, may be impregnated with silicone rubber or other material having a permeability of a similar order of magnitude. Silicone rubber at 20° C. has a permeability of $850$ $(cm^3/cm/s/cm^2/bar)$. $10^{-8}$ for hydrogen sulphide which is significantly greater than the permeability of protective materials such as butyl rubber (permeability $54 \times 10^{-8}$) ($cm^3$ $cm/s/cm^2/bar$) and materials such as Teflon FEP or nylon which can have permeability figures as low as $0.1 \times 10^{-8}$ ($cm^3$ $cm/s/cm^2/bar$).

The layers 13 are surrounded by a primary reinforcement structure comprising four layers 14 of sheathed reinforcing elements 15 which will be described in more detail below. The reinforcing elements 15 in each layer are wound helically at touch pitch with the elements in the successive layers extending in opposite senses.

The layers 14 are then surrounded by two wrapping layers 16 constructed substantially similar to the layers 13 but intended to act as a barrier which resists intrusion of the polymeric material of a relatively outer cover 17 during the formation thereof by extrusion or other method. Suitable materials for the outer cover 17 include high permeability materials such as silicone rubber or lower permeability materials such as nylon which are perforated, e.g. after formation of cover 17, to increase the effective permeability of the cover. The wrapping layers 16 may be impregnated by a high permeability material such as silicone rubber and especially in such cases the layers 16 will serve additionally as selective filters which although not presenting substantial resistance to the flow therethrough of substances such as hydrogen sulphide or water, will significantly restrict the ingress of sea salts towards the reinforcing layers 14.

The construction of the reinforcing elements 15 will now be described in more detail. The elements 15 are intended when wound helically as above described to provide a primary reinforcement high tensile structure in which load carrying high tensile elements such as wires of steel or other suitable material are embedded in a stress distributing matrix of a silicone rubber or other material which offers a similar relatively high permeability to the passage of hydrogen sulphide.

The reinforcing elements each comprise a core 15a of high tensile steel cord surrounded by a protective sheath 15b which serves to resist deterioration of the high tensile core by corrosive gases or liquids in the pipe wall. The protective sheath 15b as shown in FIG. 2 is formed from e.g. butyl rubber, nylon or Teflon though other materials of similar or lower permeability may be used.

The sheathed core is encapsulated in a matrix of silicone rubber 15c which has a relatively high permeability in comparison with the material of the sheath, and this matrix is formed to provide the reinforcing element with a square section external profile so that on winding the element 15 helically at touch pitch there is facilitated accurate positioning and spacing of the high tensile core in the successive layers of the reinforcement layer.

In the resulting pipe the fluoroplastic sealing layer 12 is the layer which plays the greatest part in containing oil within the pipe, but especially in use of the pipe to transport oil at high pressures and temperatures this layer is not of sufficiently low permeability to prevent the outward migration of certain gases including hydrogen sulphide which can have a highly corrosive effect on the high tensile steel tubes hitherto used in the pipe lines for transporting crude oil. In the pipe of the present invention, however, the reinforcement structure of the pipe is not in the form of a continuous barrier towards which corrosive gases would migrate in time; instead the reinforcement structure of the pipe comprises a reinforcement element in which the high tensile material presents a relatively open structure having spaces filled at least in part with silicone rubber or like material which is of a relatively high permeability and thus presents a preferential path for the flow of corrosive gases past the high tensile material. It has also been described above that layers of the pipe lying radially outwards of the reinforcement structure are of a relatively high permeability compared with that of high tensile steel and the material of the butyl rubber or other protective sheath, and thus corrosive gases passing through the sealing layer 12 will tend to flow directly to the outer surface of the pipe and exhibit relatively little tendency to migrate towards the high tensile reinforcing cores.

In a modified construction the layers 14 are again formed from strips, optionally of a greater width than thickness, and are provided with a protective sheath for example of a material having a low permeability and good corrosion resistance, the strips being slightly spaced apart at least over part of their length without any material between the successive turns. Gases permeating through the pipe wall are thus afforded substantially unrestricted flow through the reinforcement structure. In this form of construction the strips for forming the layers 14 may be substantially as shown in FIG. 2 or may be devoid of the matrix material. In the latter case the reinforcement structure comprises successive turns of sheathed elements having paths extending between the successive turns to permit the substantially direct flow of gases radially outwards through the reinforcement structure. If desired, a uniformity of spacing of successive turns may be achieved by means of spacing elements located between the turns temporarily during manufacture of the pipe.

Another modification which may be made is in respect of the construction of the sealing layer 12. This may alternatively comprise a temperature reducing radially inner part of fluoroplastics material, typically having a thickness of approximately 4 mm, surrounded by an outer part of a cross-linked elastomer which would serve as a creep reducer for the sealing layer.

While the invention has been described specifically in relation to a reinforcing element comprising a high tensile core sheathed with nylon or other material of relatively low permeability compared with silicone rubber, in an alternative embodiment the protective sheath may comprise a coating of metal or similar material which additionally or alternatively to offering protection by virtue of a low permeability, offers protection by electrolytic action. Suitable metal coatings, which may be applied by plating, include zinc, and preferably there is used for the coating a relatively low hardness material, e.g. below Rockwell 22, to reduce stress levels at the surface of the high tensile core.

The protective layer of metal or other material intended to protect by cathodic action may be an alternative to the above described sheath of butyl rubber or similar permeability or may be additional thereto, in the latter case the metal coating being provided between the high tensile core and sheath.

Having now described our invention what we claim is:

1. A pipe for transporting crude oil therethrough and having a preferential path through the wall of the pipe for passage of a gas emanating from the crude oil, said pipe comprising:
   (a) a plurality of superposed annular layers, the innermost lining layer being surrounded by a fluoroplastic sealing layer which is resistant to oil penetration but permits passage of a gas therethrough;
   (b) a reinforcement structure radially outwards of the sealing layer, said structure comprising successive helical turns, spaced along the length of the pipe, of at least one steel cord, each said at least one steel cord being surrounded by a protective sheath;
   (c) said protective sheath comprising a layer of a material having a permeability of less than $10 \times 10^{-8}$ (cm$^3$ cm/s/cm$^2$/bar) in respect of hydrogen sulphide at 20° C.;
   (d) a matrix material surrounding said sheathed steel cord and being of a material of high permeability compared with the material of the sheath, that permeability being greater than $150 \times 10^{-8}$ (cm$^3$ cm/s/cm$^2$/bar) in respect of hydrogen sulphide at 20° C., said matrix acting to position longitudinally the helical turns in relation to each other and to define a preferential path of high gas permeability for passage of gas through the reinforcement structure;
   (e) an outer cover surrounding the reinforcement structure and being of high gas permeability.

2. A pipe for transporting crude oil comprising a plurality of superposed annular layers, including an inner layer of polymeric material for containing oil within the bore of the pipe, said inner layer of polymeric material being bound at a radially outer surface by a wrapping layer which restrains radial flow of said polymeric material, and a reinforcement structure for supporting said layer of polymeric material, the reinforcement structure lying radially outwards of the layer of polymeric material and comprising successive axially spaced helical turns of at least one high tensile reinforcement element provided with a protective sheath, the material of said protective sheath having a permeability which is low compared with that of the respective path extending between each of the successive turns from a radially inner to a radially outer surface of the reinforcement structure so as to provide a preferential path for the passage of corrosive gases from the polymeric layer through the reinforcement structure.

3. A pipe for transporting crude oil comprising a plurality of superposed annular layers, including an inner layer of polymeric material for containing oil within the bore of the pipe, said inner layer of polymeric material being bound at a radially inner surface by a wrapping layer which restrains radial flow of said polymeric material, and a reinforcement structure for supporting said layer of polymeric material, the reinforcement structure lying radially outwards of the layer of polymeric material and comprising successive axially spaced helical turns of at least one high tensile reinforcement element provided with a protective sheath, the material of said protective sheath having a permeability which is low compared with that of the respective path extending between each of the successive turns from a radially inner to a radially outer surface of the reinforcement structure so as to provide a preferential path for the passage of corrosive gases from the polymeric layer through the reinforcement structure.

4. A pipe for transporting crude oil therethrough and having a preferential path through the wall of the pipe for passage of a gas emanating from the crude oil, said pipe comprising:
   (a) a plurality of superposed annular layers, the innermost lining layer being surrounded by a sealing layer which is resistant to oil penetration but permits passage of a gas therethrough;
   (b) a reinforcement structure radially outwards of the sealing layer, said structure comprising successive helical turns, spaced along the length of the pipe, of at least one high tensile element, each said at least one high tensile element being surrounded by a protective sheath;
   (c) said protective sheath comprising a layer of a material having a permeability of less than $10 \times 10^{-8}$ (cm$^3$ cm/s/cm$^2$/bar) in respect of hydrogen sulphide at 20° C.;
   (d) a matrix material surrounding said sheathed high tensile element and being of a material of high permeability compared with the material of the sheath, that permeability being greater than $150 \times 10^{-8}$ (cm$^3$ cm/s/cm$^2$/bar) in respect of hydrogen sulphide at 20° C., said matrix acting to position longitudinally the helical turns in relation to each other and to define a preferential path of high gas permeability for passage of gas through the reinforcement structure;
   (e) an outer cover surrounding the reinforcement structure and being of high gas permeability.

5. A pipe for transporting crude oil therethrough and having a preferential path through the wall of the pipe for passage of a gas emanating from the crude oil, said pipe comprising:
   (a) a plurality of superposed annular layers, the innermost lining layer being surrounded by a sealing layer which is resistant to oil penetration but permits passage of a gas therethrough;

(b) a reinforcement structure radially outwards of the sealing layer, said structure comprising successive helical turns, spaced along the length of the pipe, of at least one high tensile element, each said at least one high tensile element being surrounded by a protective sheath, successive turns of said helically wound sheathed reinforcement element being spaced apart in the axial direction of said pipe to permit substantially unrestricted flow of gases radially outwards from said sealing layer;

(c) said protective sheath comprising a layer of a material having a permeability of less than $10 \times 10^{-8}$ (cm$^3$ cm/s/cm$^2$/bar) in respect of hydrogen sulphide at 20° C.;

(d) an outer cover surrounding the reinforcement structure and being of high gas permeability.

6. A pipe for transporting crude oil comprising a plurality of superposed annular layers, an inner layer being of polymeric material for containing oil within the bore of the pipe and a reinforcement structure for supporting said layer of polymeric material, the reinforcement structure lying radially outwards of the layer of polymeric material and comprising successive axially spaced helical turns of at least one high tensile reinforcement element provided with a protective sheath, the material of said protective sheath having a permeability which is low compared with that of the respective paths extending between each of the successive turns from a radially inner to a radially outer surface of the reinforcement structure so as to provide a preferential path for the passage of corrosive gases from the polymeric layer through the reinforcement structure, the permeability of said polymeric material sealing layer being lower than the maximum permeability of each of said paths through the reinforcement structure.

7. A pipe according to claim 6 wherein the sheathed reinforcement element is embedded in a matrix of a material which has a permeability greater than $150 \times 10^{-8}$ (cm$^3$ cm/s/cm$^2$/bar) in respect of hydrogen sulphide at 20° C.

8. A pipe according to claim 7 wherein the protective sheath is of a material having a low permeability compared with the material of the matrix.

9. A pipe according to claim 8 wherein the protective sheath is formed of butyl rubber or aliphatic polyamide.

10. A pipe according to claim 6 wherein the protective sheath is of a material having a permeability less than $10 \times 10^{-8}$ (cm$^3$ cm/s/cm$^2$/bar) in respect of hydrogen sulphide at 20° C.

11. A pipe according to claim 6 wherein the protective sheath is formed of a material which exhibits electrolytic action.

12. A pipe according to claim 11 wherein said protective sheath comprises an inner protective layer which is surrounded by an outer protective layer.

13. A pipe according to claim 6 wherein the protective sheath comprises non-metallic material.

14. A pipe according to claim 13 wherein the non-metallic material is a phosphate or silicate, 15. A pipe according to claim 6 wherein the layer of polymeric material has a permeability lower than that of the permeability of a path through the reinforcement structure.

16. A pipe according to claim 6 wherein the matrix material has a permeability greater than $300 \times 10^{-8}$ (cm$^3$ cm/s/cm$^2$/bar) in respect of hydrogen sulphide at 20° C.

17. A pipe according to claim 16 wherein the matrix material is silicone rubber.

18. A pipe according to claim 6 comprising a crush resisting layer radially inwards of said reinforcement structure.

19. A pipe according to claim 18 wherein the crush resisting layer comprises at least two helical reinforcing elements shaped such that contacting surfaces of the elements between successive turns of the helices are of a substantially frusto-conical shape.

20. A pipe according to claim 18 wherein said layer of polymeric material for containing oil within the bore of the pipe lies radially outwards of said crush resisting layer and radially inwards of the reinforcement structure.

21. A pipe according to claim 6 wherein the layer of polymeric material comprises fluoro-plastics.

22. A pipe according to claim 6 wherein said layer of polymeric material has a thickness in the range 5 to 9 mm.

23. A pipe according to claim 6 wherein the reinforcement element comprises high tensile steel.

24. A pipe according to claim 23 wherein said element is in strip wire, strand or cable form.

25. A pipe according to claim 6 wherein the reinforcement structure comprises a helically wound reinforcement strip comprising a core formed by said high tensile reinforcement element and a protective sheath surrounding said core.

26. A pipe according to claim 25 wherein the strip comprises said protective sheath surrounded by a matrix material of high permeability.

27. A pipe according to claim 25 wherein at least over part of their lengths successive turns of the helically wound strip are spaced apart in the axial direction of the pipe to permit substantially unrestricted flow of gases through the reinforcement structure.

28. A pipe according to claim 6, wherein the layer of polymeric material has a permeability to hydrogen sulphide similar to that of fluor-plastics.

* * * * *